(12) United States Patent
Karlsson

(10) Patent No.: US 9,432,072 B2
(45) Date of Patent: Aug. 30, 2016

(54) DOCKING SYSTEM FOR A WIRELESS COMMUNICATION DEVICE

(71) Applicant: Ascom Sweden AB, Gothenburg (SE)

(72) Inventor: Jonas Karlsson, Alingsas (SE)

(73) Assignee: Ascom Sweden AB, Gothenburg (SE)

( * ) Notice: Subject to any disclaimer, the term of this patent is extended or adjusted under 35 U.S.C. 154(b) by 0 days.

(21) Appl. No.: 14/566,230

(22) Filed: Dec. 10, 2014

(65) Prior Publication Data

US 2015/0162945 A1 Jun. 11, 2015

(30) Foreign Application Priority Data

Dec. 11, 2013 (EP) ..................................... 13196642

(51) Int. Cl.
*H04B 1/38* (2015.01)
*H04B 1/3883* (2015.01)
*H04M 1/04* (2006.01)
*H04M 1/725* (2006.01)
*H02J 7/00* (2006.01)

(52) U.S. Cl.
CPC ........... *H04B 1/3883* (2013.01); *H02J 7/0027* (2013.01); *H02J 7/0044* (2013.01); *H04M 1/04* (2013.01); *H04M 1/72527* (2013.01); *H04M 1/72563* (2013.01); *H04M 1/72569* (2013.01); *H02J 7/007* (2013.01); *H04M 2250/12* (2013.01)

(58) Field of Classification Search
CPC .................. H04B 1/3877; H04M 1/72527
USPC .............................. 455/566, 575.1, 557, 573
See application file for complete search history.

(56) References Cited

U.S. PATENT DOCUMENTS

| 6,888,338 B1 | 5/2005 | Popescu-Stanesti et al. |
| 8,255,720 B1 | 8/2012 | Conway |
| 2009/0209293 A1 | 8/2009 | Louch |
| 2011/0098087 A1 | 4/2011 | Tseng |
| 2011/0098917 A1 | 4/2011 | LeBeau et al. |
| 2011/0098918 A1 | 4/2011 | Siliski et al. |
| 2011/0099316 A1 | 4/2011 | Tseng et al. |
| 2011/0099392 A1 | 4/2011 | Conway |

(Continued)

FOREIGN PATENT DOCUMENTS

| WO | WO-2011149709 A1 | 12/2011 |
| WO | WO-2013087970 A1 | 6/2013 |

OTHER PUBLICATIONS

European Search Report dated May 26, 2014 from corresponding application EPSN 13196642.6 filed Dec. 11, 2013.

*Primary Examiner* — John J Lee
(74) *Attorney, Agent, or Firm* — Harness, Dickey & Pierce, P.L.C.

(57) ABSTRACT

There is provided a docking system comprising a mobile communication device comprising an accelerometer, a first docking station configured to hold the communication device at a first tilt angle; and a second docking station configured to hold the communication device at a second tilt angle, the second angle being different from the first angle, wherein the communication device further comprises processing circuitry configured to, when the communication device is placed in the docking station: detect an electrical connection between the mobile device and docking station; enable the accelerometer and detect a tilt angle of the communication device; and based on the detected tilt angle, identify a docking station and set charging properties of the communication device. There is also provided a method for setting properties of a mobile device based on a measured tilt angle.

15 Claims, 3 Drawing Sheets

(56) References Cited

U.S. PATENT DOCUMENTS

| | | |
|---|---|---|
| 2011/0099486 A1 | 4/2011 | Nesladek et al. |
| 2011/0099507 A1 | 4/2011 | Nesladek et al. |
| 2011/0106534 A1 | 5/2011 | LeBeau et al. |
| 2011/0119596 A1 | 5/2011 | Nesladek et al. |
| 2011/0131358 A1 | 6/2011 | Ganesh et al. |
| 2011/0141006 A1 | 6/2011 | Rabu |
| 2011/0165890 A1 | 7/2011 | Ho et al. |
| 2011/0230209 A1 | 9/2011 | Kilian |
| 2011/0291927 A1* | 12/2011 | Slaby .............. B60R 11/0241 345/158 |
| 2012/0021778 A1 | 1/2012 | Ho et al. |
| 2012/0021808 A1* | 1/2012 | Tseng .............. G01C 21/265 455/575.1 |
| 2012/0022786 A1 | 1/2012 | Siliski et al. |
| 2012/0022787 A1 | 1/2012 | LeBeau et al. |
| 2012/0022876 A1 | 1/2012 | LeBeau et al. |
| 2012/0023417 A1 | 1/2012 | Nesladek et al. |
| 2012/0023463 A1 | 1/2012 | Tseng et al. |
| 2012/0030393 A1 | 2/2012 | Ganesh et al. |
| 2012/0252532 A1* | 10/2012 | Williams ............ H04M 1/04 455/566 |
| 2012/0303851 A1 | 11/2012 | Tseng et al. |
| 2012/0329441 A1 | 12/2012 | Tseng |
| 2013/0232324 A1 | 9/2013 | Rubin et al. |

* cited by examiner

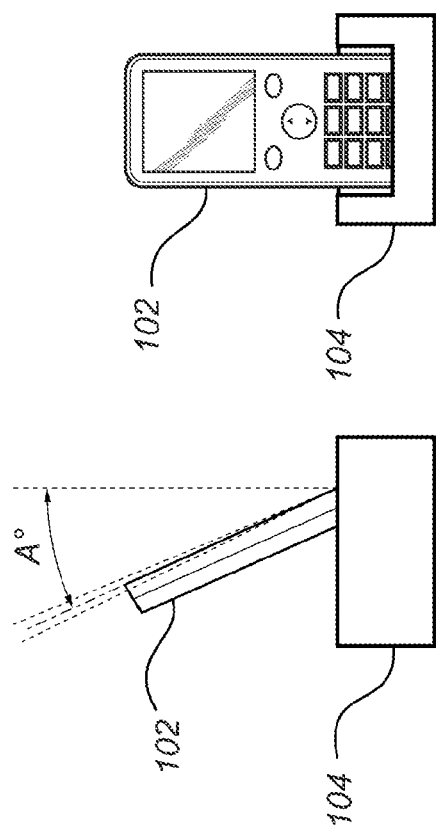
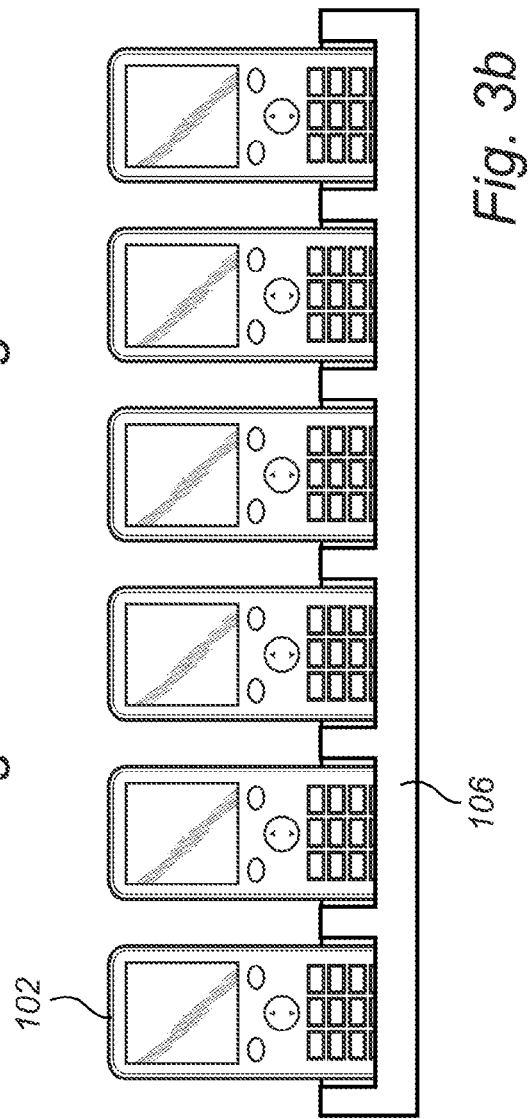
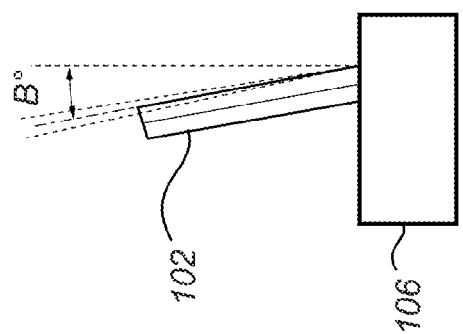

DOCKING SYSTEM FOR A WIRELESS COMMUNICATION DEVICE

FIELD OF THE INVENTION

This application claims priority to EPC Patent Application No. 13196642.6 filed on Dec. 11, 2013, the entire contents of which are incorporated herein by reference.

The present invention relates to a wireless communication system. In particular, the present invention relates to a mobile device and a docking station in a wireless communication system.

TECHNICAL BACKGROUND

Mobile communication devices are used in an ever wider range of applications. In addition to the evolution of personal phones towards smartphones, there is also an increasing need for wireless communication systems being specifically adapted to particular environments and circumstances.

Such an adapted communication system may for example use the DECT-protocol for communication between mobile devices and/or base stations. It is also possible to integrate dedicated mobile communication units in a conventional Wi-Fi environment using versions of the 802.11 protocol or a cellular network.

Regardless of the technology used for communication via mobile communication devices, there is always a desire to improve the mobile device in itself, for example by making it smaller, lighter, less expensive or more robust, depending on the application at hand.

As mobile devices comprise an energy storage unit, typically in the form of a chargeable battery, in some cases a charging connector must be arranged in the mobile device. In many mobile devices the charging connector is arranged at the lower portion of the device so that it may be arranged in a charging station in a more or less upright position. Furthermore, it may be desirable to be able to arrange the mobile device in charging stations, or docking stations, or of various types. The different charging stations may for example be located on a desk, in a vehicle, outdoors or at a dedicated charging location.

However, in devices known today, a series of at least one pin in the connecting portion of the device is required for identifying the type of charging station in which the device has been arranged in order to accurately determine and adapt the charging of the device to the charging properties of the specific charging station. The identification may be performed by grounding or sending a digital signal to one of the pins in the connector of the mobile device, via the corresponding connector in the charging station, where the pin that is grounded or signaled is different for different charging stations. Such a solution takes up valuable space and volume in the portion of the mobile device where the charging connector is arranged.

Accordingly, it is desirable to provide an improved way of identifying charger characteristics for a charger in which a mobile communication device is arranged.

SUMMARY OF THE INVENTION

In view of the above-mentioned desired properties of a communication system and a mobile communication device, and the above-mentioned and other drawbacks of the prior art, it is an object of the present invention to provide an improved communication system and a method for setting properties of a mobile communication device.

According to a first aspect of the present invention, it is therefore provided a wireless communication system comprising: a mobile communication device comprising an accelerometer; a first docking station configured to hold the communication device at a first tilt angle; and a second docking station configured to hold the communication device at a second tilt angle, the second angle being different from the first angle, wherein the communication device further comprises processing circuitry configured to, when the communication device is placed in the docking station: detect an electrical connection between the mobile device and docking station; enable the accelerometer and detect a tilt angle of the communication device; and based on the detected tilt angle, identify a docking station and set charging properties of the communication device.

The mobile communication device may in the present context for example be a portable phone, or a handheld device, in a wireless communication system, and the docking station should be understood as being connected to an electrical power supply such that a phone arranged in the docking station may be charged. The mobile device should also be understood to comprise a battery.

The tilt angle is the angle in relation to the vertical plane. Accordingly, for a device such as a phone being arranged in an upright position, the tilt angle is 0°, and for a phone being placed horizontally, the tilt angle is 90°.

The present invention is based in the realization that in order to simplify the design and reduce construction complexity of a mobile device, and in particular in the lower portion of the device where a connector typically is arranged, the specific docking station in which the device is arranged may be determined by determining the tilt angle of the device when the device is arranged in the docking station. Thereby, the design of the charging connector may be simplified and space may be saved in the lower portion of the communication device.

Furthermore, by enabling the accelerometer only once it is detected that the device is arranged in a docking station, the power consumption resulting from use of the accelerometer is kept to a minimum. Thus, the accelerometer is totally neutral with respect to battery performance of the device as it is only activated once a connection to a docking station having charging capabilities is established.

Based on the detected angle, the docking station is identified and properties of the mobile device may be set according to what is desirable for a particular docking station.

In one embodiment of the invention, the processing circuitry may be configured to set a charging current based on the detected angle. Having two different docking stations, being capable of providing two different charging currents, detecting the type of charger in which the mobile device is arranged makes it possible to in the control circuitry set the charging current.

According to one embodiment of the invention, the processing circuitry is configured to set the charging current to a value limited by a maximum current value of the charger or by a maximum current value of a battery of the mobile device. With regard to the charging current, two possible limitations are identified which may control the setting of the charging current. In a first scenario, the battery is capable of receiving the maximum charging current that the docking station may provide. Thereby, the charging current is limited by the current which may be provided by the docking station. In a second scenario, the docking station may be capable of providing a charging current which is higher than a maximum allowable current which the battery can handle.

Thereby, the processing circuitry controls the charging current from the docking station to match the capabilities of the battery.

According to one embodiment of the invention, the first and second docking station may be identified if the detected angle is within ±5° of the first and second tilt angle, respectively. It is advantageous to have a certain tolerance range so that a particular type of docking station may be identified even if the mobile device is lightly offset in relation to an intended position in a docking station.

According to one embodiment of the invention, the processing circuitry may further be configured to, based on the detected angle, set a configuration profile of said communication device.

Furthermore, the setting the configuration profile may comprise setting a ring tone, a ring volume, a vibration, a display behavior and/or a call reception status of communication device. In addition to set the charging characteristics based on the type of docking station, it may also be advantageous to set other properties of the mobile device. Thereby, the properties of the device can be set automatically to a profile suitable for the location or type of docking station. It is of course also possible to set other parameters in addition to the ones discussed above, which should be seen as non-limiting examples.

In one embodiment of the invention the first docking station may be configured to hold the communication device at a tilt angle of about 10°, and the second docking station may be configured to hold the communication device at a tilt angle of about 36°. A docking station configured to hold a communication device at an angle of about 13° may for example be a wall mounted docking station, while a docking station configured to hold a communication device at an angle of about 36° may be a docking station suitable for placing on surface such as a shelf, desk or table area.

According to a second aspect of the invention, there is provided a method for setting properties of a mobile communication device in a wireless communication system comprising: a mobile communication device comprising an accelerometer, a first docking station configured to hold said communication device at a first tilt angle; and a second docking station configured to hold said communication device at a second tilt angle, said second angle being different from said first angle, said method comprising the steps of, in said communication device: detecting an electrical connection between a docking station and said communication device; enabling said accelerometer; measure a tilt angle of said mobile device using said accelerometer; setting a profile of said mobile device based on said measured tilt angle.

In one embodiment of the invention, the settings of the communication device are maintained if the measured angle does not correspond to one of the predetermined angle ranges. Thereby, if the detected angle range is not recognized, the settings are not altered.

According to one embodiment of the invention, setting a call reception status of the mobile device may comprise setting an automated reply, forwarding or dismissing an incoming call. Depending on the detected docking station, it may be advantageous to control how incoming calls are handled. For example, if the mobile device is located in a docking station recognized as being used for over-night storage, incoming calls may be redirected to an automated reply or be forwarded to another device.

Further effects and features of this second aspect of the present invention are largely analogous to those described above in connection with the first aspect of the invention.

Further features of, and advantages with, the present invention will become apparent when studying the appended claims and the following description. The skilled person will realize that different features of the present invention may be combined to create embodiments other than those described in the following, without departing from the scope of the present invention.

BRIEF DESCRIPTION OF THE DRAWINGS

These and other aspects of the present invention will now be described in more detail with reference to the appended drawings showing an example embodiment of the invention, wherein:

FIGS. 2a-b schematically illustrates a docking station for use in a system according to an embodiment of the invention;

FIGS. 3a-b schematically illustrates a docking station for use in a system according to an embodiment of the invention;

DETAILED DESCRIPTION OF PREFERRED EMBODIMENTS OF THE INVENTION

In the present detailed description, various embodiments of a wireless communication system according to the present invention are mainly discussed with reference to a wireless communication system with mobile devices in the form of portable phones connected by a common internal network. It should be noted that this by no means limits the scope of the present invention which is equally applicable to other types of communication systems and devices, such as for example mobile phones, portable computers or tablet devices.

Figure 1:
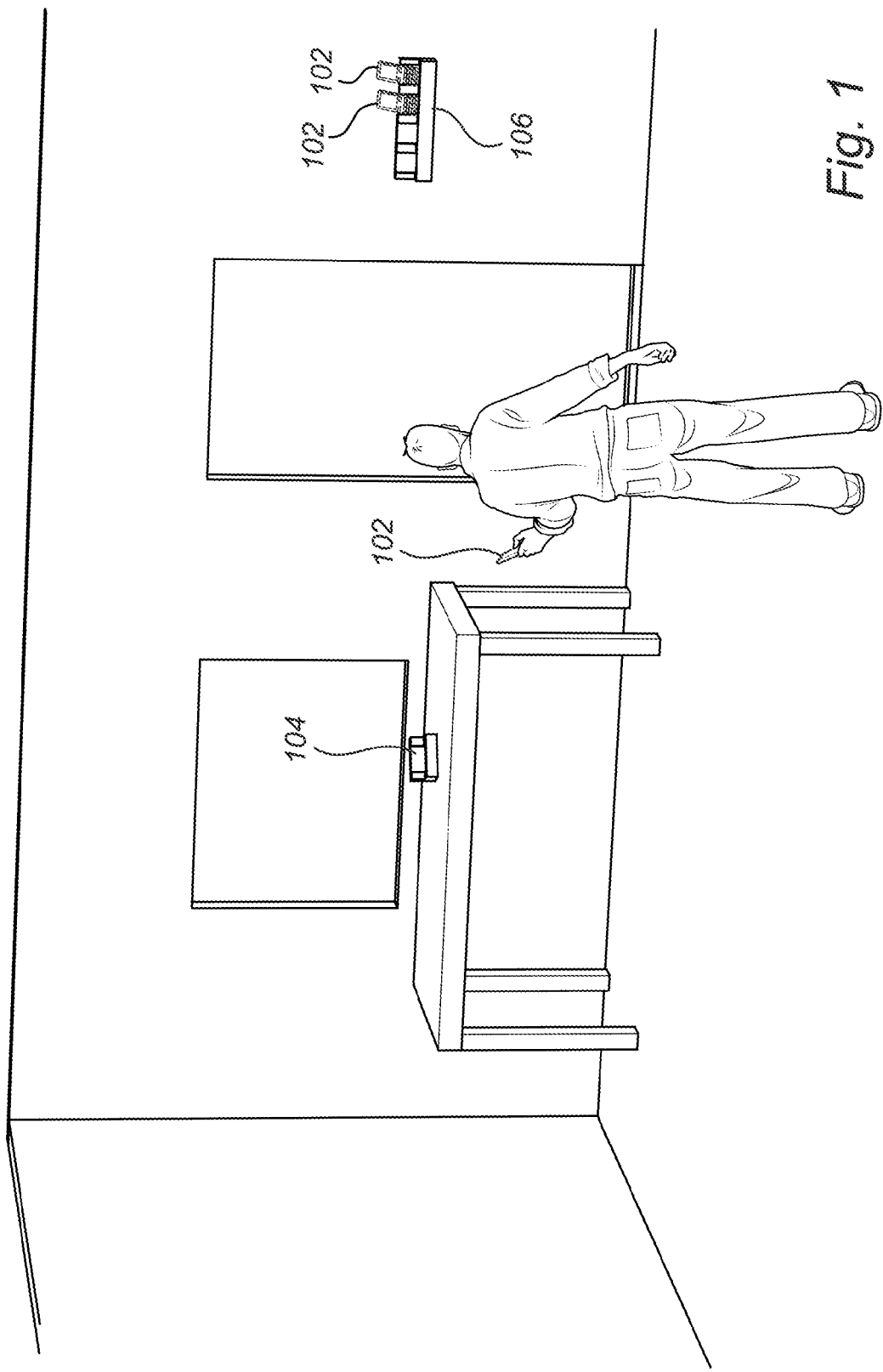
FIG. 1 schematically illustrates a system according to an embodiment of the invention.

FIG. 1 schematically illustrates a wireless communication system in an indoor environment. The communication system comprises a wireless mobile communication device, here represented by a portable phone 102, comprising an accelerometer. The phone 102 may for example be a DECT-phone, or a phone for use in a Wi-Fi-network. The system further comprises a first type of docking station 104, for simplicity referred to as type A, and a second type of docking station 106, referred to as type B.

The docking station 104 of type A may for example be a docking station configured to hold a single phone 102, whereas the docking station 106 of type B is here shown as a wall mounted docking station configured to hold a plurality of devices. The wall mounted docking station 106 may for example be used for overnight storage and charging of phones meaning that the phone will not be monitored while in the docking station 106.

As illustrated in FIGS. 2a and 2b, the docking station 104 of type A is configured to hold the phone at a tilt angle A°. The tilt angle is here illustrated as the angle between the phone 102 and the vertical plane. The angle A may for example be approximately 36°±5°.

In FIGS. 3a and 3b, a docking station 106 of type B is illustrated, being configured to hold the phone at a tilt angle B°. The angle B may for example be approximately 13°±5°. As is readily realized, the given angles are merely examples, and essentially any angle may be used, as long as there is a detectable difference in angle between the two types of docking stations. Furthermore, the system described herein comprises two types of docking stations. The general concept of the invention is naturally applicable to a system comprising a larger number of docking stations, provided that the respective types of docking stations are configured to hold a mobile device at different angles.

Figure 4:
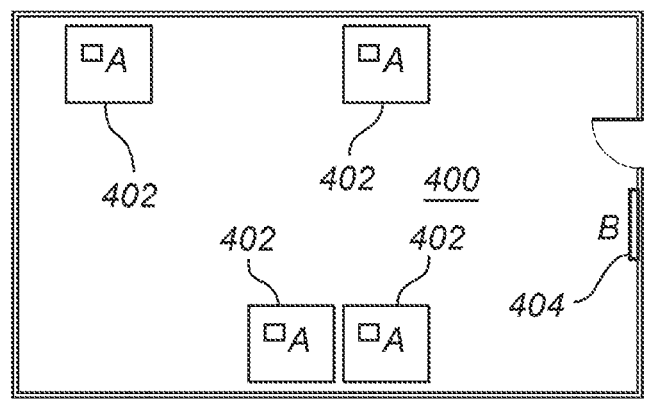
FIG. 4 schematically illustrates a system according to an embodiment of the invention.
Figure 5:
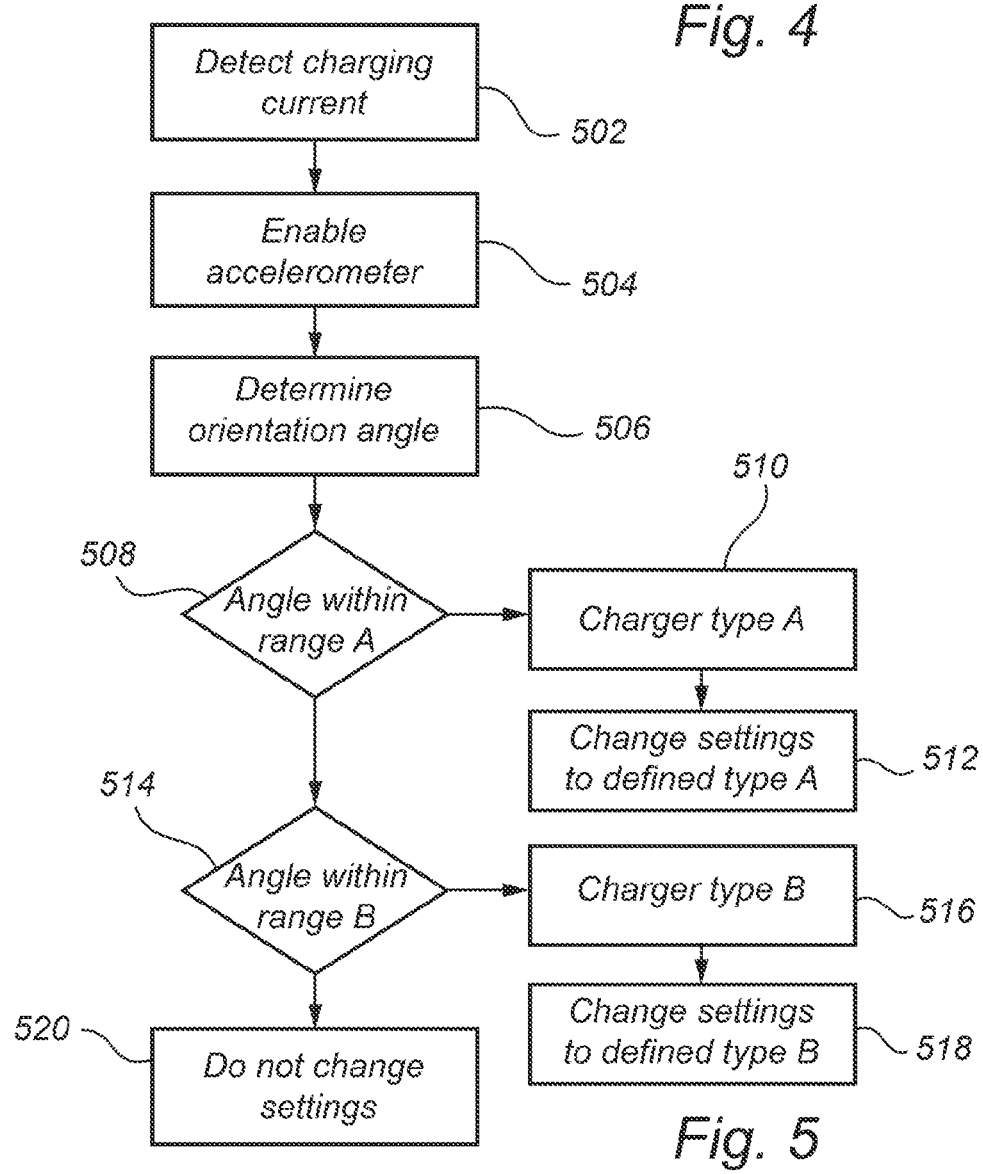
FIG. 5 is a flow chart outlining the general steps of a method according to an embodiment of the invention.

A function of the wireless communication system will be described with reference to FIG. 4 showing an example system 400 comprising a first type of docking station 402 (type A) and a second type of docking station 404 (type B), and with reference to the flow chart of FIG. 5.

In a first step 502, when a mobile device 102 is placed in a docking station, the processing circuitry detects an electrical connection to a docking station, for example in the form of a charging current provided by the docking station.

When the mobile device has detected that it is at that time located in a docking station, the accelerometer of the mobile device 102 is enabled in step 504. The accelerometer may for example be a capacitive micro machined accelerometer. Such an accelerometer is typically has an angle resolution as small as 0.1°±0.002°. As is readily realized by the person skilled in the art, many different types of accelerometers may be used in the present context.

Once the accelerometer has been activated, the tilt angle of the mobile device may be determined 506. The tilt angle may also be referred to as an orientation angle an angle of inclination or the like, and the angle may be described with reference to the vertical plane, the horizontal plane or any other predetermined reference plane. This angular measurement is compared against pre-configured angular ranges which in turn correspond to the specific angles of the mobile device 102 when in docking stations of type "A" or "B" plus or minus a tolerance range allowing certain variations in the position of the charger itself. As an example, the tilt angle is 36° in a docking station of type A and 13° in a docking station of type B. The tolerance range may for example be ±5°. If more different types of docking stations are used, the tolerance range may have to be reduced, whereas if only two types of docking stations are used, the tolerance range may be higher.

When a tilt angle is determined by the accelerometer, the angle is compared to stored angles corresponding to known types of docking stations. If the angle is within an angle range corresponding to a docking station of type A, it is determined 508, 510 that the mobile device is arranged in a docking station of type A and the settings of the mobile device 102 are changed 512 to a predetermined set of settings specific for a docking station of type A.

If the angle is within an angle range corresponding to a docking station of type B, it is determined 514, 516 that the mobile device is arranged in a docking station of type B and the settings of the mobile device 102 are changed 518 to a predetermined set of settings specific for a docking station of type B.

If the measured angle does not correspond to any known angle range, the settings of the mobile device 102 are maintained 520.

The charging current for different docking stations may for example be set according to the following examples.

Example 1

Docking station Type A provides a charging current of 500 mA. In the case that a docking station Type A is recognized by the handset upon connection, the charging current supplied to the battery by the charging IC will be set to 500 mA, to suit the power supply connected to the charger.

Example 2

Docking station Type B provides a charging current of 1000 mA. In the case that a docking station Type B is recognized by the handset upon connection, the charging current supplied to the battery by the charging IC will be set to 1000 mA, to suit the power supply connected to the charger.

Furthermore, a range of settings may be adjusted in the mobile device based on the detected docking station. Examples of parameters which can be set, and possible parameter values include:

Ringer volume: High, Medium, low, silent.
Vibration: On, off.
Call reception handling: Normal, automatic answer, forward to preset, reject call.
Display illumination: Idle (mid-luminosity), on, off.

It should be understood that the above are merely examples of parameters and functions of the mobile device 102 which may be set based on the detected type of docking station. Any other function of the mobile device 102 may equally well be set.

Additionally, settings of the above set of parameters, and/or other parameter settings, are preferably combined to form profiles, which may be stored in the mobile device 102 either as pre-programmed profiles or as user defined profiles. Based on the above a large number of combinations are possible and the profiles may be formed to suit any particular circumstance.

Even though the invention has been described with reference to specific exemplifying embodiments thereof, many different alterations, modifications and the like will become apparent for those skilled in the art. For example, any type of wireless mobile communication device may be used. Also, it should be noted that parts of the system may be omitted, interchanged or arranged in various ways, the communication system yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A docking system for a wireless communication device comprising:
   a mobile communication device including an accelerometer;
   a first docking station configured to hold the mobile communication device at a first tilt angle; and
   a second docking station configured to hold the mobile communication device at a second tilt angle, the second angle being different from the first angle, wherein
   the mobile communication device further includes processing circuitry configured to, when the mobile communication device is placed in a docking station of the first and second docking stations,
   detect an electrical connection between the mobile communication device and the docking station, enable the accelerometer only once it is detected that the mobile communication device is arranged in the docking station, and detect a tilt angle of the mobile communication device, and based on the detected tilt angle, identify the docking station and set charging properties of the mobile communication device.

2. The system according to claim 1, wherein the processing circuitry is configured to set a charging current based on the detected tilt angle.

3. The system according to claim 2, wherein the processing circuitry is configured to set the charging current to a value limited by one of a maximum current value of a charger and a maximum current value of a battery of the mobile communication device.

4. The system according to claim 1, wherein the first and second docking stations are identified, if the detected tilt angle is within ±5° of the first and second tilt angles, respectively.

5. The system according to claim 1, wherein the processing circuitry is further configured to, based on the detected tilt angle, set a configuration profile of the mobile communication device.

6. The system according to claim 5, wherein setting the configuration profile includes setting at least one of a ring tone, a ring volume, a vibration, a display behavior and a call reception status of the mobile communication device.

7. The system according to claim 1, wherein the first docking station is configured to hold the mobile communication device at a tilt angle of about 13°, and the second docking station is configured to hold the mobile communication device at a tilt angle of about 36°.

8. A method for setting properties of a mobile communication device in a docking system including a mobile communication device having an accelerometer, a first docking station configured to hold the mobile communication device at a first tilt angle, and a second docking station configured to hold the mobile communication device at a second tilt angle, the second tilt angle being different from the first tilt angle, the method comprising the steps of, in the mobile communication device:

detecting an electrical connection between a docking station of the first and second docking stations, and the mobile communication device;

enabling the accelerometer when the mobile communication device has detected that it is at that time located in the docking station;

measuring a tilt angle of the mobile communication device using the accelerometer; and setting a profile of the mobile communication device based on the measured tilt angle.

9. The method according to claim 8, further comprising;

comparing the tilt angle to a set of predetermined angles, each predetermined angle in the set of predetermined angles corresponds to a unique type of docking station.

10. The method according to claim 8, wherein the step of detecting the electrical connection includes determining a voltage from the docking station.

11. The method according to claim 8, further comprising, matching the measured tilt angle to one of a predetermined set of angle ranges.

12. The method according to claim 11, wherein each angle range in the predetermined set of angle ranges correspond to a unique type of docking station.

13. The method according to claim 11, further comprising:

maintaining settings of the mobile communication device, if the measured tilt angle does not correspond to an angle range of the predetermined set of angle ranges.

14. The method according to claim 8, wherein the step of setting the profile comprises:

setting at least one of a ring tone, a ring volume, a vibration, a display behavior and a call reception status of the mobile communication device.

15. The method according to claim 14, wherein setting the call reception status includes one of setting an automated reply, forwarding an incoming call, and dismissal of the incoming call.

* * * * *